United States Patent
Boulay

(10) Patent No.: US 8,682,510 B2
(45) Date of Patent: Mar. 25, 2014

(54) METHOD FOR ENABLING LANDING ON AN OFFSET RUNWAY

(75) Inventor: Thierry Boulay, Colombes (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/376,139

(22) PCT Filed: Jun. 4, 2010

(86) PCT No.: PCT/EP2010/057858
§ 371 (c)(1),
(2), (4) Date: Mar. 16, 2012

(87) PCT Pub. No.: WO2010/139799
PCT Pub. Date: Dec. 9, 2010

(65) Prior Publication Data
US 2012/0265377 A1    Oct. 18, 2012

(30) Foreign Application Priority Data
Jun. 5, 2009   (FR) ..................................... 09 02729

(51) Int. Cl.
*G01C 21/20*    (2006.01)

(52) U.S. Cl.
USPC .................... 701/17; 701/5; 701/16; 343/705

(58) Field of Classification Search
USPC .................... 701/17, 5, 16; 343/705
See application file for complete search history.

(56) References Cited

U.S. PATENT DOCUMENTS

| | | |
|---|---|---|
| 3,381,295 A | 4/1968 | Blackledge |
| 4,368,517 A | 1/1983 | Lovering |
| 2010/0286852 A1 | 11/2010 | Bouquet |

FOREIGN PATENT DOCUMENTS

| | | | |
|---|---|---|---|
| FR | 1 569 759 A | * | 6/1969 |
| FR | 1569759 | | 6/1969 |
| FR | 2925712 A1 | | 6/2009 |

OTHER PUBLICATIONS

James H. Remer, et al, "Microwave Landing System (MLS) Area Navigation: Computed Centerline Expeiements and System Accuracy Analyses in an RF Environment", Efficient Conduct of Individual Flights and Air Traffic of Optimum Utilization of Modern Technology (Guidance, Control, Navigation, Communication, Surveillance and Processing Facilities) for the Overall Benefit of Civil and Military Airspace Users, Dec. 1, 1986, pp. 41-1 thru 41-17, vol. 410, XP008113571.

(Continued)

*Primary Examiner* — Mary Cheung
*Assistant Examiner* — Brian P Sweeney
(74) *Attorney, Agent, or Firm* — Baker & Hostetler LLP

(57) ABSTRACT

A method for determining the distance of an aircraft from an offset runway during a landing by offset approach, the offset runway being situated at a distance D from a main runway equipped with at least one elevation beacon, comprises at least the following steps: determining the height h at which the aircraft is situated, height determined with respect to a point T1 of the offset runway, height measured by a radioaltimeter with which the aircraft is equipped, determining the angle of elevation φ of the MLS mode by using the information of the elevation beacon provided by an elevation beacon with which said main runway is equipped, determining the value of the distance ρ of the aircraft from the azimuth beacon (10) by using the following formula $$\rho = \sqrt{\left(\frac{\frac{h}{\operatorname{Tan}(\varphi)} - D2}{\operatorname{Cos}(\theta)}\right)^2 + h^2},$$

and, using said distance ρ to obtain a point of location of the aircraft in an offset runway reference frame.

2 Claims, 2 Drawing Sheets

(56) References Cited

OTHER PUBLICATIONS

J.W. Hall, et al., "Examination of TRCA/DO-198 Position Reconstruction Algorithms for Area Navigation with the Microwave Landing System", Technical Report Prepared by the Mitre Corporation, Jun. 1, 1990, 54 pgs., vol. ESD-TR-90-308, No. AD-A224 804, Bedford, Massachusetts, XP009104064.

D. Van Willigen, et al., "Radio Navigation—Air Traffic Systems", Internet citation URL:http://www.pn.ewi.tudelft.nl/education/et4-022/notes/ [retrieved Jul. 29, 2008], Jul. 29, 2008, pp. 51-64, XP002490240.

* cited by examiner

METHOD FOR ENABLING LANDING ON AN OFFSET RUNWAY

CROSS-REFENCE TO RELATED APPLICATIONS

This application is a National Stage of International patent application PCT/EP2010/057858, filed on Jun. 4, 2010, which claims priority to foreign French patent application No. FR 0902729, filed on Jun. 5, 2009, the disclosures of which are incorporated by reference in their entirety.

FIELD OF THE INVENTION

The subject of the invention relates to a method for determining a distance between an aircraft and the azimuth beacon of a main runway equipped with azimuthal and elevational beacons in order to land on a runway offset from the main runway, that is to say situated at a distance d from the runway, the runways lying parallel to one another.

The invention is used, for example, in the field of aeronautics for radionavigation.

BACKGROUND

Within the framework of automatic or semi-automatic landings, the objective of radionavigation is to lead the aircraft into a space, aligned with the axis of the landing runway and with a descent slope of 3° (typical but programmable). To the knowledge of the Applicant, this is customarily carried out by virtue of onboard equipment, for example a multimode receiver better known by the abbreviation MMR, which receives the signals from various navigation systems such as: the instrument landing system or "ILS", the MLS system (the acronym standing for the expression "Microwave Landing System"), the FLS system ("Flight landing system") and the GLS ("Global landing system") positioning system. The microwave landing system called MLS is a system for aiding instrument approach and landing, intended to provide an aircraft with its position in spherical coordinates in a reference frame tied to the landing runway, that is to say an angle of azimuth, an angle of elevation). The angles of azimuth and of elevation, being known to persons skilled in the art working in this field, will not be explained. The MLS, such as standardized by the ICAO worldwide organization, transmits signals for lateral guidance, that is to say an angle of azimuth, and for vertical guidance, that is to say an angle of elevation, by using a technique of referenced-time beating beams and a time-multiplexed signal. The use of a time-multiplexed signal allows the transmission of the signals for lateral and vertical guidance on the same radiofrequency channel without creating interference between the signals for lateral guidance and the signals for vertical guidance. The guidance signals are emitted on a frequency of around 5 Giga Hertz (GHz) by an azimuth station and an elevation station. The azimuth station is placed at the end of the runway while the elevation station is situated on the side of the runway, about 300 meters from the runway start threshold. Each station transmits a narrow beating beam, sweeping the coverage space back and forth at constant angular speed along the angular coordinate considered. An antenna and a receiver onboard the aircraft receive the beating beam a first time during the outward sweep and a second time during the return sweep. It is thus possible to determine the angle of azimuth or the angle of elevation through the following linear relation:

$$\theta = (T - T_0) \cdot \frac{v}{2} \quad (1)$$

where $\theta$ is the angle of azimuth or the angle of elevation,
T a time interval between the reception of the outward and return scans of the beating beam,
$T_0$ the value of the time interval T for a zero angle $\theta$ and
$v$ the angular sweep rate.

$T_0$ and $v$ are constants defined by the international standards for MLS, known from the prior art.

Offset approaches are approaches which are carried out using the MLS signals of the main runway (where the MLS beacons are situated), but for aiding landing on a runway parallel to this runway and covered by the signals of the beacons. This type of approach is described in standard DO226 (previously in standard DO198), standards known to the person skilled in the art in the field of radionavigation.

The algorithms proposed by standard DO226 make it necessary to obtain distance information. This distance information is obtained either via a measurement device better known by the acronym DME (abbreviation of Distance Measuring Equipment), or via GPS information (by following for example the method described in the application filed by the applicant FR 07 09035). A drawback of proceeding in such a way is notably the need to equip the aircraft with an additional device, this possibly turning out to be expensive.

SUMMARY OF THE INVENTION

The idea of the present invention consists notably in obtaining the distance information through the joint use of items of equipment already present in an aircraft, MMR equipment and a radioaltimeter which makes it possible to provide the information about the height of the aircraft with respect to the closest ground point.

The invention relates to a method for determining the distance of an aircraft from an offset runway during a landing by offset approach, the offset runway being situated at a distance D from a main runway equipped with at least one elevation beacon, characterized in that it comprises at least the following steps:

Determining the height h at which the aircraft is situated, height determined with respect to a point T1 of the offset runway, height measured by a radioaltimeter with which the aircraft is equipped, Determining the angle of elevation of the MLS mode by using the information of the elevation beacon provided by an elevation beacon with which said main runway is equipped, Determining the value of the distance ρ of the aircraft from the azimuth beacon by using the following formula $$\rho = \sqrt{\left(\frac{\frac{h}{\text{Tan}(\varphi)} - D2}{\text{Cos}(\theta)}\right)^2 + h^2}$$

where $\theta$ and $\phi$ are the angles decoded by the MMR corresponding respectively to the angle between the aircraft and the azimuth beacon, and the angle between the aircraft and the elevation beacon and D2 is defined as the distance between the azimuth beacon and the elevation beacon along the x axis, with x, y and z the coordinates of the aircraft in the reference frame of the elevation beacon Using said distance ρ to obtain a point of location of the aircraft in an offset runway reference frame.

BRIEF DESCRIPTION OF THE DRAWING

Other characteristics and advantages of the device according to the invention will be more apparent on reading the description which follows of an exemplary embodiment given by way of wholly nonlimiting illustration together with the figures which represent.

DETAILED DESCRIPTION

Figure 1:
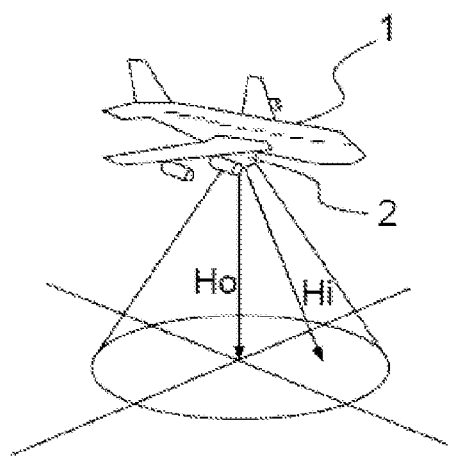
FIG. 1 an aircraft equipped with a radio altimeter.
Figure 4:
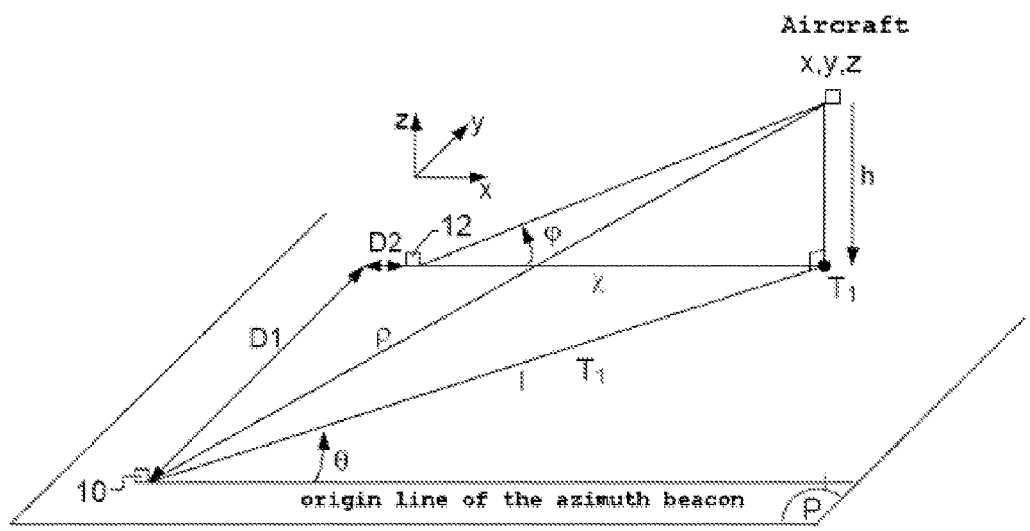

In FIG. 1 is represented an aircraft 1 equipped with a radioaltimeter 2 adapted for providing height information $H_0$, taken as being the shortest distance between the aircraft 1 and a point S on the ground. The distance $H_0$, or h in FIG. 4, is a distance considered as perpendicular to the ground during the aircraft's landing approach.

The aircraft 1 is also equipped with a multimode reception device or MMR, which makes it possible to perform radioguided approaches to the landing runway. This receiver allows notably guidance by numerous means known in the field, such as the aforementioned ILS, MLS, MLS-CC, FLS and GLS system modes.

Figure 2:
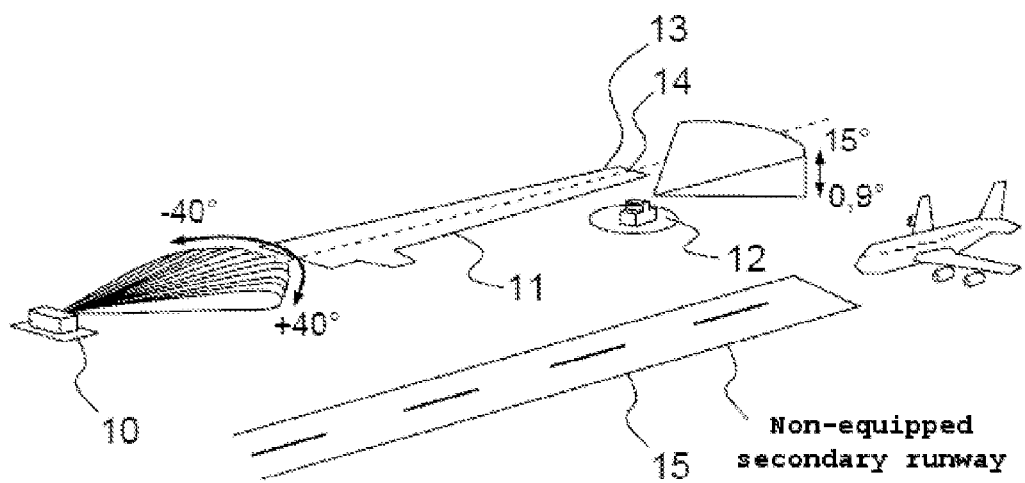
FIG. 2, a representation of a main runway equipped with beacons and an aircraft initiating its descent at the level of a runway offset from the equipped main runway, FIG. 3, a diagram showing a landing runway, the coverage of the antenna, the aircraft's ground touchdown points, FIG. 4, a basic diagram for the reconstruction of the distance of the aircraft.

The example given by way of nonlimiting illustration of the invention of FIG. 2 relates more particularly to the use of the MLS mode. This mode allows centering on a main runway by virtue of two beacons, an azimuth beacon 10 and an elevation beacon 12. The azimuth beacon 10 provides information about horizontal angular discrepancy with respect to the equipped main runway 11 and the elevation beacon 12 provides information about vertical angular discrepancy with respect to the point at which the aircraft's wheels put down on the runway. FIG. 2 also presents the threshold 14 of the runway or point of touchdown of the wheels of the aircraft.

The azimuth beacon 10 allows for example an angle measurement between −40° and +40° and the elevation beacon between 0.9° and 15°, these values being given merely by way of indication to illustrate the invention without limiting the scope thereof.

The idea of the present invention consists notably in using the aircraft height h provided by the radioaltimeter situated on the aircraft and the angle provided by the elevation beacon of the MLS mode with which the main runway is equipped to determine the distance d between the aircraft 1 and the azimuth beacon 10, doing so in order to allow its landing on a runway 15 offset by a distance D with respect to the equipped main runway. h is the height determined with respect to a point T1 of the offset runway.

Figure 3:
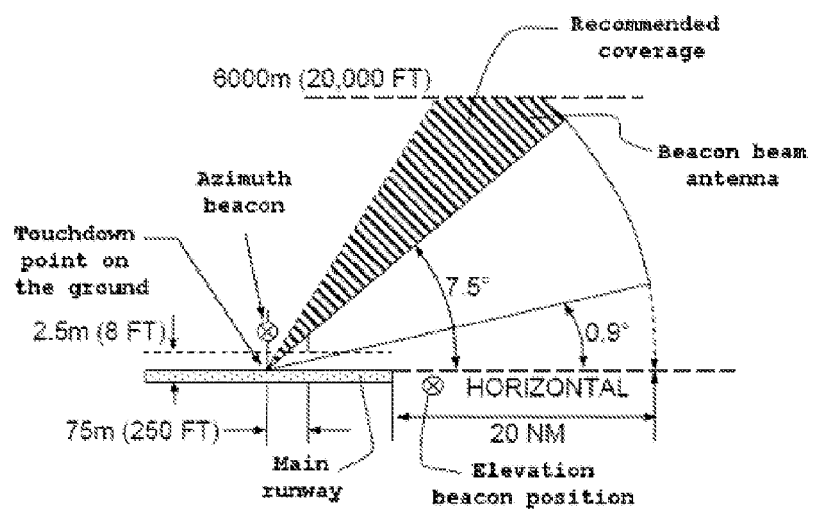

FIG. 3 shows schematically a landing runway Pa, a ground touchdown point of the aircraft Ts, the position of the elevation beacon 12 and the position of the azimuth beacon 10. It also shows the coverage of the beacon beam antenna.

FIG. 4 shows schematically the diagram for determining the distance ρ when the aircraft is situated at the point A, the azimuth beacon B, the point C being the point on the runway and taken vertically in line with the aircraft.

The azimuth and elevation beacons are positioned in one and the same plane P, they therefore have the same coordinates along the z axis.

The method employs in the reference frame of the elevation beacon 12, D1 and D2 are provided by the data link, the following data:

$$\rho^2 = l^2 + h^2$$

$$\cos(\theta) = \frac{x - D2}{l}$$

$$\tan(\varphi) = \frac{h}{x}$$

i.e.

$$x = \frac{h}{\tan(\varphi)}$$

and $$l = \frac{\frac{h}{\tan(\varphi)} - D2}{\cos(\theta)}$$

Hence $$\rho = \sqrt{\left(\frac{\frac{h}{\tan(\varphi)} - D2}{\cos(\theta)}\right)^2 + h^2}$$

with:

The coordinates x, y and z are the coordinates of the aircraft in the reference frame of the elevation beacon 12.

The distance D2 is defined as the distance between the azimuth beacon 10 and the elevation beacon 12 along the x axis.

The distance D1 is defined as the distance between the azimuth beacon 10 and the elevation beacon 12 along the y axis.

The data link: is defined as being an RF transmission of data received and decoded by the MMR. The data arising from this transmission indicate the geometric positioning of the main runway and of the beacons 10, 12. The data of the data link make it possible to determine the distances D1 and D2.

The angles θ and φ are the angles decoded by the MMR corresponding respectively to the angle between the aircraft 1 and the azimuth beacon 10, and φ the angle of elevation between the aircraft 1 and the elevation beacon 12.

The advantages of the method and the system according to the invention are those of reconstructing distance information on the basis of the joint information of items of equipment already present on an aircraft, for example an MMR and a radioaltimeter and of using this distance value in the reconstruction algorithms known from the prior art.

They avoid the use of additional equipment that could generate electronic disturbances and could also make the device more expensive.

The invention claimed is:

1. A method for determining a distance of an aircraft from an offset runway during a landing by offset approach utilizing a Multimode Reception Device (MMR) and a radioaltimeter, the offset runway being situated at a distance D from a main runway equipped with at least one elevation beacon, comprising:

determining a height h at which the aircraft is situated, the height being determined with respect to a point T1 of the offset runway, the height being measured by the radioaltimeter with which the aircraft is equipped and thus corresponds to a perpendicular height between the aircraft and ground, determining an angle of elevation φ based on a MLS mode of the MMR by using information provided by the at least one elevation beacon with which said main runway is equipped, determining a value of a distance $\rho$ of the aircraft from an azimuth beacon by using the following formula:

$$\rho = \sqrt{\left(\frac{\frac{h}{\tan(\varphi)} - D2}{\cos(\theta)}\right)^2 + h^2}$$

where $\theta$ and $\varphi$ are angles decoded by the MMR corresponding respectively to an angle between the aircraft and the azimuth beacon and an angle between the aircraft and the elevation beacon, and D2 is defined as a distance between the azimuth beacon and the elevation beacon along the x axis, with x, y and z coordinates of the aircraft being in a reference frame of the elevation beacon, using said distance $\rho$ to obtain a point of location of the aircraft in an offset runway reference frame.

2. The method as claimed in claim 1, wherein the distance $\rho$ is used in a reconstruction algorithm utilized by the MMR described in at least one of the standard DO198 and the standard DO226.

* * * * *